US012575706B2

(12) United States Patent
Liu

(10) Patent No.: US 12,575,706 B2
(45) Date of Patent: Mar. 17, 2026

(54) SEALING STRUCTURE AND SMART CLEANING APPARATUS

(71) Applicant: Beijing Roborock Technology Co., Ltd., Beijing (CN)

(72) Inventor: Xiaoming Liu, Beijing (CN)

(73) Assignee: Beijing Roborock Technology Co., Ltd., Beijing (CN)

( * ) Notice: Subject to any disclaimer, the term of this patent is extended or adjusted under 35 U.S.C. 154(b) by 1049 days.

(21) Appl. No.: 17/640,798

(22) PCT Filed: Aug. 13, 2020

(86) PCT No.: PCT/CN2020/108902
§ 371 (c)(1),
(2) Date: Mar. 4, 2022

(87) PCT Pub. No.: WO2021/042959
PCT Pub. Date: Mar. 11, 2021

(65) Prior Publication Data
US 2022/0330775 A1      Oct. 20, 2022

(30) Foreign Application Priority Data

Sep. 5, 2019    (CN) .......................... 201921473122.7

(51) Int. Cl.
*A47L 11/24*          (2006.01)
*A47L 11/40*          (2006.01)
*G02B 7/02*           (2021.01)

(52) U.S. Cl.
CPC ............... *A47L 11/24* (2013.01); *A47L 11/40* (2013.01); *G02B 7/02* (2013.01)

(58) Field of Classification Search
CPC ........ A47L 11/24; A47L 11/40; A47L 9/2894; A47L 2201/04; G02B 7/02
See application file for complete search history.

(56) References Cited

U.S. PATENT DOCUMENTS

2007/0244610 A1* 10/2007 Ozick ................. A47L 11/4072
                                                                      342/417
2008/0276407 A1    11/2008 Schnittman et al.
2019/0254490 A1*  8/2019 Marutani ............. G05D 1/0251

FOREIGN PATENT DOCUMENTS

CN          104110585 A     10/2014
CN          104302218 A      1/2015
                (Continued)

OTHER PUBLICATIONS

CN109044208A(machine translation) (Year: 2018).*
                (Continued)

*Primary Examiner* — Andrew A Horton
(74) *Attorney, Agent, or Firm* — Calfee, Halter & Griswold LLP

(57) ABSTRACT

The present disclosure relates to a sealing structure and a smart cleaning device. The sealing structure is configured to seal an infrared wall-following module of the smart cleaning device. The sealing structure includes a housing and a lens. The housing is connected to a side of the infrared wall-following module facing a protective shell of the smart cleaning device. The lens is connected to the housing, and the lens covers a side surface of the housing facing the protective shell. The lens includes an arc-shaped panel and a connecting plate that is arranged on an edge of the arc-shaped panel and that extends toward the infrared wall-following module.

8 Claims, 14 Drawing Sheets

(56)            References Cited

FOREIGN PATENT DOCUMENTS

| | | | |
|---|---|---|---|
| CN | 105615778 | A | 6/2016 |
| CN | 205697554 | U | 11/2016 |
| CN | 106660349 | A | 5/2017 |
| CN | 207082015 | U | 3/2018 |
| CN | 207463778 | U | 6/2018 |
| CN | 108903848 | A | 11/2018 |
| CN | 109044208 | A | 12/2018 |
| CN | 109124496 | A | 1/2019 |
| CN | 209063102 | U | 7/2019 |
| CN | 210931221 | U | 7/2020 |
| EP | 2303085 | A1 | 4/2011 |
| EP | 3484677 | A1 | 5/2019 |
| KR | 100711972 | B1 | 5/2007 |
| WO | 2018/013754 | A1 | 1/2018 |
| WO | 2019/132317 | A1 | 10/2019 |

OTHER PUBLICATIONS

Communication from European Application No. 20860214.4 Jul. 25, 2023.
Chinese Patent Right Evaluation Report of application No. 201921473122.7 dated Aug. 3, 2023.

* cited by examiner

SEALING STRUCTURE AND SMART CLEANING APPARATUS

CROSS-REFERENCE TO RELATED APPLICATIONS

This application is a United States national phase of a Patent Cooperation Treaty (PCT) application PCT/CN22020/108902 filed on Aug. 13, 2020, which claims priority to Chinese Patent Application No. CN201921473122.7 filed on Sep. 5, 2019. Priority to the preceding patent applications is expressly claimed, and the disclosures of the preceding applications are hereby incorporated herein by reference in their entireties and for all purposes.

TECHNICAL FIELD

The present disclosure relates to the field of smart cleaning device technologies, and in particular, to a sealing structure and a smart cleaning device.

BACKGROUND

With the development of technologies, various automatic cleaning devices appear, for example, automatic sweeping robots and automatic mopping robots. The automatic cleaning devices can automatically perform a cleaning operation, which is convenient for users. For example, the automatic sweeping robot automatically cleans a to-be-swept region through direct scraping, vacuum cleaning, or the like. The scraping operation can be performed using a scraper and rolling brush structure at the bottom of the automatic cleaning device. The automatic sweeping robot with a mopping function usually needs to have a water tank during mopping to provide a water source needed for mopping.

SUMMARY

Embodiments of the present disclosure provide a sealing structure and a smart cleaning device.

According to an aspect, embodiments of the present disclosure provide a sealing structure, which is configured to seal an infrared wall-following module of a smart cleaning device. The sealing structure includes: a housing, where the housing is connected to a side of the infrared wall-following module facing a protective shell of the smart cleaning device; and a lens, where the lens is connected to the housing, and the lens covers a side of the housing facing the protective shell; the lens includes an arc-shaped panel and a connecting plate that is arranged on an edge of the arc-shaped panel and that extends toward the infrared wall-following module; and the arc-shaped panel and the connecting plate are arranged to intersect each other.

According to an aspect of the embodiments of the present disclosure, the housing is connected to the lens by using an engaging structure; the engaging structure includes an engaging buckle and an engaging hole that cooperate with each other; the engaging buckle is arranged on one of the housing and the lens; and the engaging hole is arranged on the other of the housing and the lens.

According to an aspect of the embodiments of the present disclosure, at least a part of the connecting plate is provided with a connecting arm; the engaging hole is arranged at an end of the connecting arm away from the arc-shaped panel; and the engaging buckle is arranged at a position on the housing corresponding to the engaging hole, so as to implement the connection between the housing and the lens.

According to an aspect of the embodiments of the present disclosure, the engaging hole is a bar-shaped through hole structure penetrating the connecting plate in a thickness direction of the connecting plate.

According to an aspect of the embodiments of the present disclosure, the sealing structure further includes at least one first extension plate extending from the arc-shaped panel, where the first extension plate is smoothly connected to the arc-shaped panel.

According to an aspect of the embodiments of the present disclosure, the sealing structure further includes at least one second extension plate extending from the connecting plate in a direction away from the arc-shaped panel, where the second extension plate and the connecting plate are arranged to intersect each other.

According to an aspect of the embodiments of the present disclosure, the housing includes an upper housing and a lower housing that cooperate with each other, and the upper housing and the lower housing are detachably connected.

According to another aspect, embodiments of the present disclosure provide a smart cleaning device, including: a machine body, where the machine body is internally provided with an infrared wall-following module; the foregoing sealing structure, where the sealing structure is arranged on an outer side of the infrared wall-following module and is configured to seal the infrared wall-following module; and a protective shell, where the protective shell is arranged on an outer side of the sealing structure, and is cooperatively connected with the machine body to protect the machine body.

According to another aspect of the embodiments of the present disclosure, a through hole is arranged at a position on the protective shell corresponding to the arc-shaped panel.

According to another aspect of the embodiments of the present disclosure, a side surface of the lens facing the protective shell is closely attached to an inner wall of the protective shell.

BRIEF DESCRIPTION OF THE DRAWINGS

The following describes the features, advantages, and technical effects of example embodiments of the present disclosure with reference to the accompanying drawings. It should be noted that the figures are not drawn to scale and that elements of similar structures or functions are generally represented by like reference numerals for illustrative purposes throughout the figures. It also should be noted that the figures are only intended to facilitate the description of the preferred embodiments. The figures do not illustrate every aspect of the described embodiments and do not limit the scope of the present disclosure.

IN THE DRAWINGS

Figure 1:
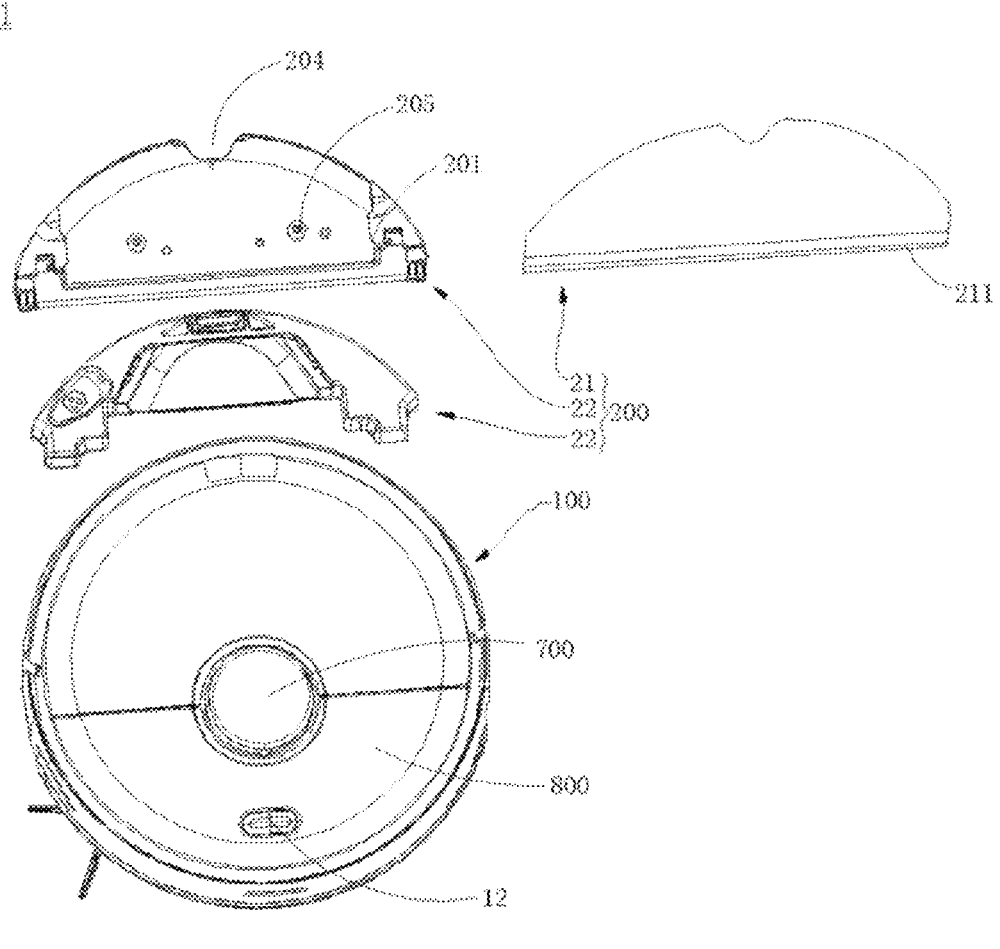
FIG. 1 is an exploded view of a smart cleaning device according to some embodiments of the present disclosure.

1: smart sweeping robot;
100: machine body;
10: driving system; 101: driving wheel module; 102: driven wheel;
11: cliff sensor;
12: man-machine interaction system;
13: dry cleaning portion; 131: rolling brush; 132: side brush;
14: forward portion;
15: backward portion;
16: fan mounting position;
200: cleaning assembly;
20: supporting plate; 201: guide protrusion; 202: second hook; 203: mounting groove; 204: notch; 205: elastic part; 206: water passage hole; 207: mounting port;
21: cleaning cloth; 211: guide bar;
22: water tank; 221: guide groove; 222: first hook;
23: control structure; 231: mounting bracket; 232: operating part;
24: button;
25: reversed return waterway board; 251: water outlet port;
300: sealing structure;
30: protective shell; 301: through hole;
31: lens; 311: arc-shaped panel; 3111: first extension plate; 312: first connecting plate; 3121: connecting arm; 3122: engaging hole; 313: second connecting plate; 314: third connecting plate; 3141: second extension board; 315: fourth connecting plate.

In the drawings, identical parts use identical reference numerals. The drawings are not drawn to actual scale.

DETAILED DESCRIPTION OF THE PREFERRED EMBODIMENTS

The following describes in detail the features and example embodiments of various aspects of the present disclosure. The following detailed description provides many specific details to facilitate a comprehensive understanding of the technical solutions provided in the present disclosure. However, it is obvious to a person skilled in the art that, the present disclosure can be implemented without some of these specific details. The embodiments are described below only to provide a better understanding of the present disclosure by showing examples of the present disclosure. In the accompanying drawings and the following descriptions, at least some of the well-known structures and technologies are omitted, so as not to unnecessarily obscure the present disclosure; in addition, for the sake of clarity, sizes of some structures may be exaggerated. In addition, the features, structures, or characteristics described below can be combined in one or more embodiments in any suitable manner.

The orientation words appearing in the following descriptions are all directions shown in the figures, and are not intended to limit specific structures of a sealing structure 300 and a smart cleaning device provided in the present disclosure. In the descriptions of the present disclosure, it should be further noted that, unless otherwise specified and limited explicitly, the terms "mounting" and "connection" should be understood in a broad sense, for example, may be fixed connection, detachable connection, or integrated connection; or may be direct connection or indirect connection. A person of ordinary skill in the art can understand specific meanings of the foregoing terms in the present disclosure depending on a specific case.

According to a smart cleaning device provided in the embodiments of the present disclosure, every time a flexible cleaning body is to be replaced, a liquid holding tank does not need to be removed, and the flexible cleaning body can be removed only when a connecting plate is removed in a forward or backward direction of a machine body. This is convenient for operation and can avoid damage to the smart cleaning device that is easily caused by removing the liquid holding tank.

To better understand the technical solutions provided in the present disclosure, the following describes in detail the smart cleaning device and a cleaning assembly 200 according to the embodiments of the present disclosure with reference to FIG. 1 to FIG. 12.

Figure 2:
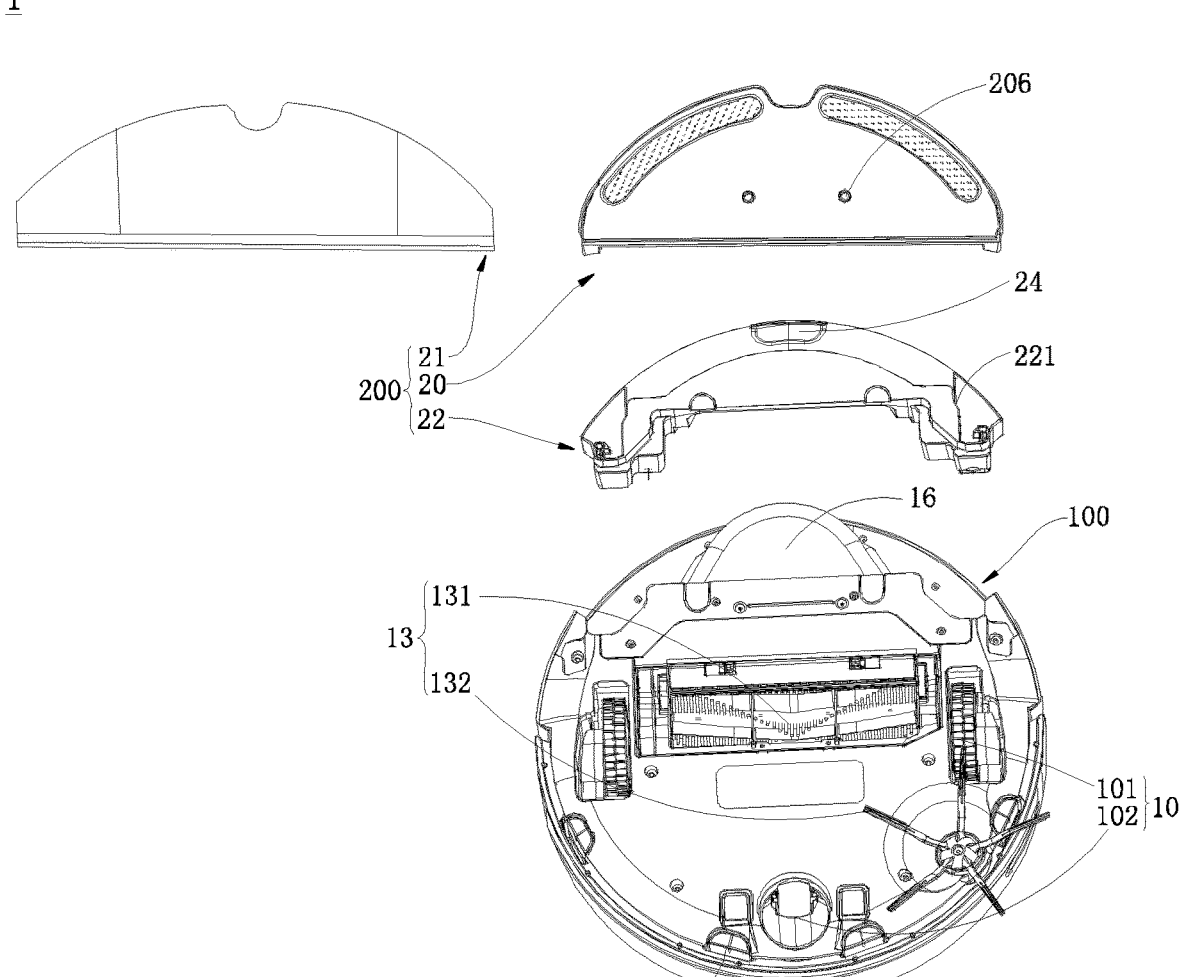
FIG. 2 is an exploded view of a smart cleaning device from another perspective according to some embodiments of the present disclosure.
Figure 3:
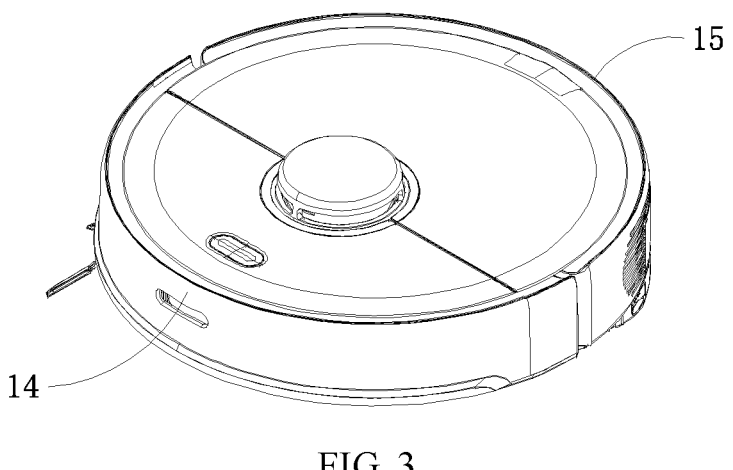
FIG. 3 is an axonometric view of a smart cleaning device according to some embodiments of the present disclosure.
Figure 4:
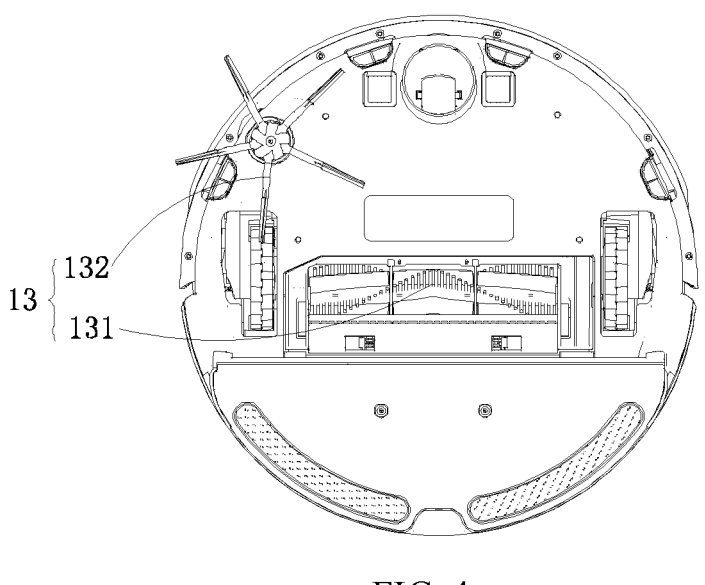
FIG. 4 is an axonometric view of a smart cleaning device from another perspective after a flexible cleaning body is removed according to some embodiments of the present disclosure.
Figure 5:
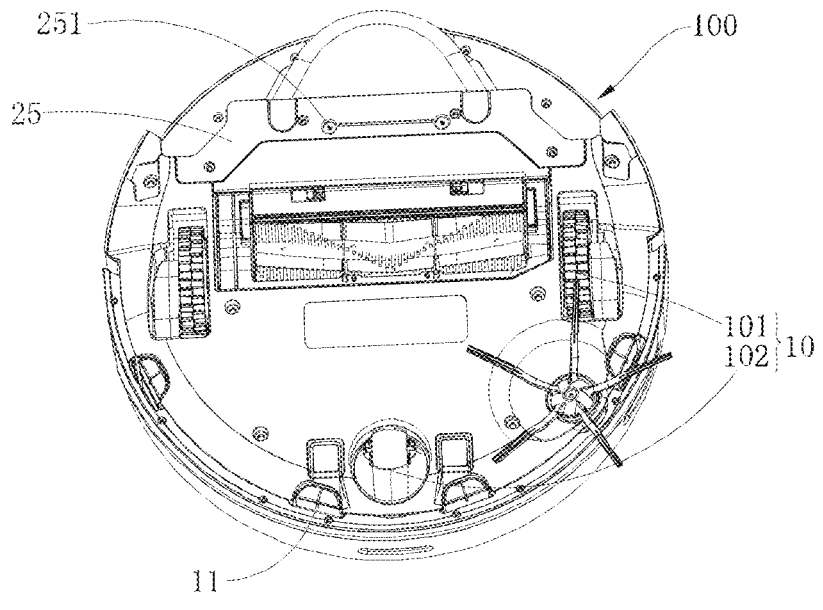
FIG. 5 is an axonometric view of a machine body according to some embodiments of the present disclosure.
Figure 6:
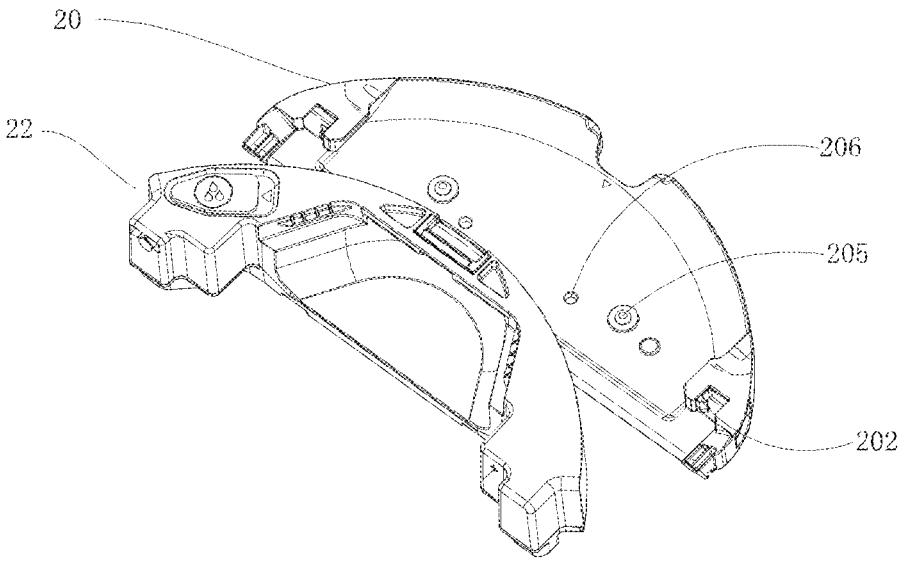
FIG. 6 is an exploded view of a connecting structure between a supporting plate and a water tank according to some embodiments of the present disclosure.
Figure 7:
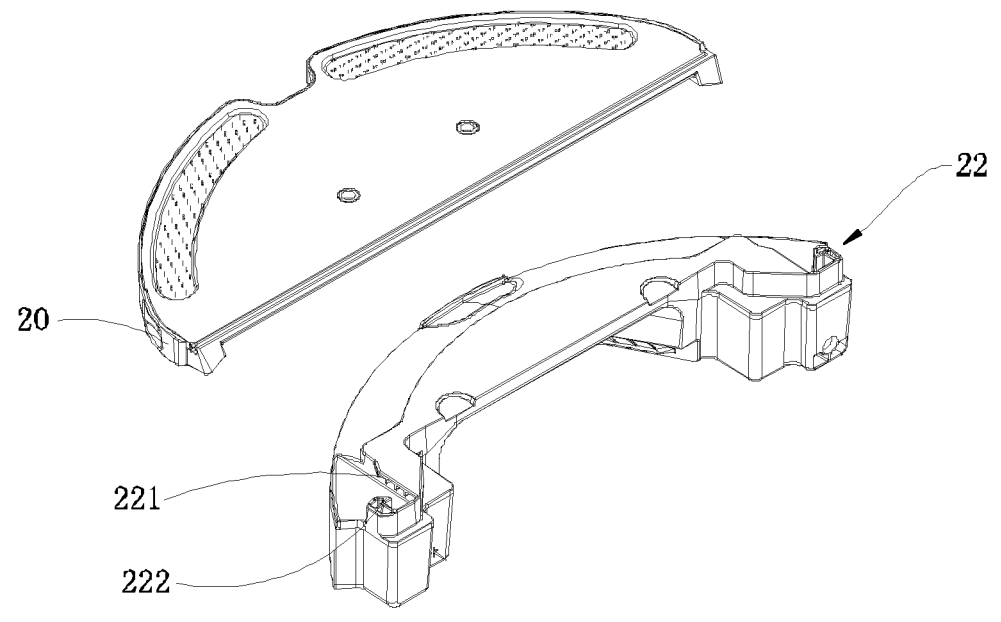
FIG. 7 is an exploded view of a connecting structure between a supporting plate and a water tank from another perspective according to some embodiments of the present disclosure.
Figure 8:
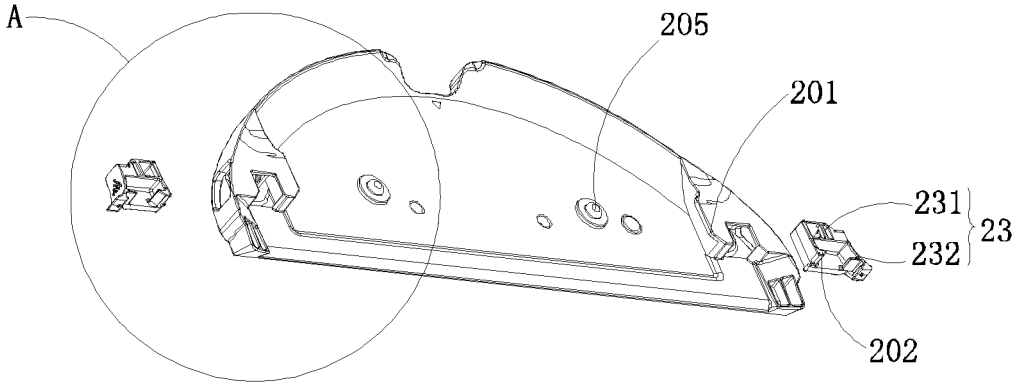
FIG. 8 is an exploded view of a connecting structure between a supporting plate and a control structure arranged on the supporting plate according to some embodiments of the present disclosure.
Figure 9:
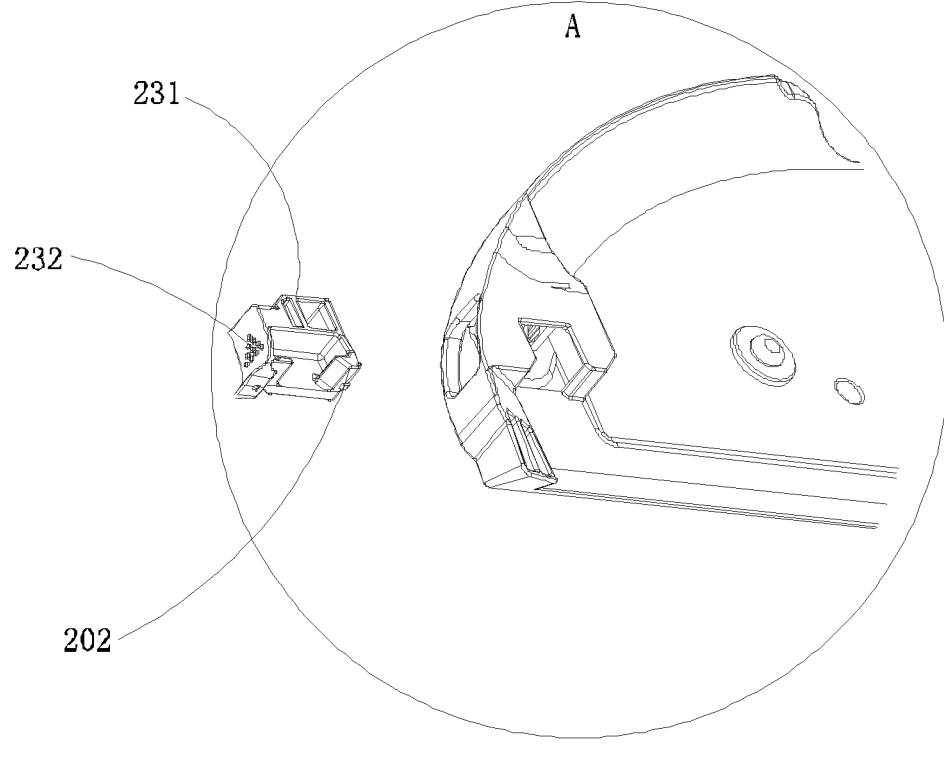
FIG. 9 is an enlarged view of a partial structure at position A in FIG. 8.
Figure 10:
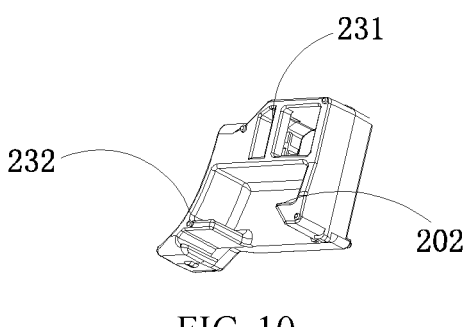
FIG. 10 is a schematic structural diagram of an integrated structure of a second hook and a control structure according to some embodiments of the present disclosure.
Figure 11:
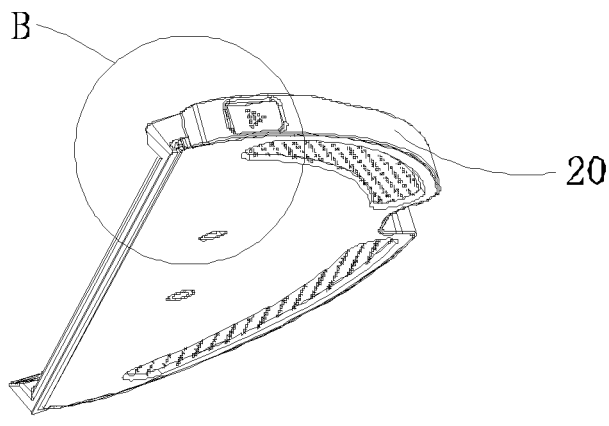
FIG. 11 is a schematic structural diagram of a connecting structure between a supporting plate and a control structure arranged on the supporting plate according to some embodiments of the present disclosure.
Figure 12:
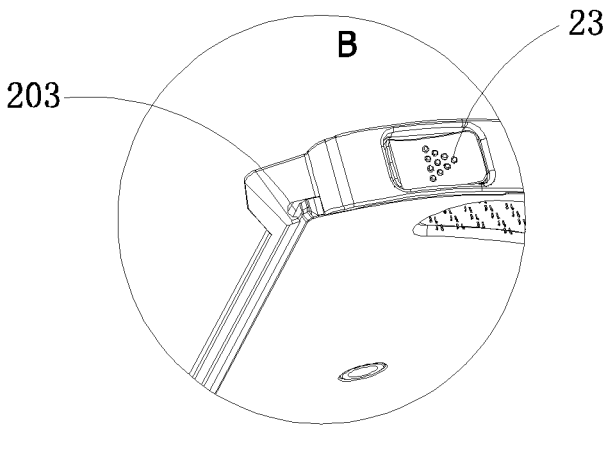
FIG. 12 is an enlarged view of a partial structure at position B in FIG. 11.

References are made to FIG. 1 to FIG. 12. FIG. 1 is an exploded view of a smart cleaning device according to some embodiments of the present disclosure. FIG. 2 is an exploded view of a smart cleaning device from another perspective according to some embodiments of the present disclosure. FIG. 3 is an axonometric view of a smart cleaning device according to some embodiments of the present disclosure. FIG. 4 is an axonometric view of a smart cleaning device from another perspective according to some embodiments of the present disclosure. FIG. 5 is an axonometric view of a machine body 100 according to some embodiments of the present disclosure. FIG. 6 is an exploded view of a connecting structure between a supporting plate 20 and a water tank 22 according to some embodiments of the present disclosure. FIG. 7 is an exploded view of a connecting structure between a supporting plate 20 and a water tank 22 from another perspective according to some embodiments of the present disclosure. FIG. 8 is an exploded view of a connecting structure between a supporting plate 20 and a control structure 23 arranged on the supporting plate 20 according to some embodiments of the present disclosure. FIG. 9 is an enlarged view of a partial structure at position A in FIG. 8. FIG. 10 is a schematic structural diagram of an integrated structure of a second hook 202 and a control structure 23 according to some embodiments of the present disclosure. FIG. 11 is a schematic structural diagram of a connecting structure between a supporting plate 20 and a control structure 23 arranged on the supporting plate 20 according to some embodiments of the present disclosure. FIG. 12 is an enlarged view of a partial structure at position B in FIG. 11.

Definitions of Names:

Forward: a traveling direction of the smart cleaning device.

Backward: a direction opposite to the traveling direction of the smart cleaning device.

Referring to FIG. 1 to FIG. 7, a smart cleaning device provided in embodiments of the present disclosure includes a machine body 100 and a cleaning assembly 200. The machine body 100 is configured to carry functional parts of the smart cleaning device. The cleaning assembly 200 is detachably arranged on the machine body 100. When the cleaning assembly 200 is mounted to or removed from the machine body 100, the cleaning assembly 200 can move in a forward or backward direction of the machine body 100. In some optional embodiments, the cleaning assembly 200 includes a liquid holding tank, a connecting plate, and a flexible cleaning body that are stacked. The connecting plate is mounted at the bottom of the liquid holding tank by using a guide structure. After the connecting plate is mounted at the bottom of the liquid holding tank, the connecting plate can float up and down relative to the liquid holding tank. In some optional embodiments, the smart cleaning device is a smart sweeping robot 1, the connecting plate is a supporting plate 20, the flexible cleaning body is a cleaning cloth 21, and the liquid holding tank is a water tank 22.

According to the smart cleaning device provided in the embodiments of the present disclosure, in some optional embodiments, the guide structure includes a guide protrusion 201 and a guide groove 221 that cooperate with each other. The guide protrusion 201 is arranged on the supporting plate 20, and the guide groove 221 is arranged on the water tank 22. A thickness of the guide protrusion 201 is smaller than a thickness of the guide groove 221, so that after the supporting plate 20 is mounted at the bottom of the water tank 22, the supporting plate 20 can float up and down relative to the water tank 22. Optionally, the thickness of the guide protrusion 201 is specifically a thickness of the guide protrusion 201 in a height direction of the smart sweeping robot 1, and the thickness of the guide groove 221 is a thickness of the guide groove 221 in the height direction of the smart sweeping robot 1.

It can be understood that the guide structure is not limited to the foregoing structural form, and a specific structure of the guide structure can also be arranged as follows: the guide structure includes the guide protrusion 201 and the guide groove 221 that cooperate with each other. The guide protrusion 201 is arranged on the water tank 22, and the guide groove 221 is arranged on the supporting plate 20. The thickness of the guide protrusion 201 is smaller than the thickness of the guide groove 221, so that after the supporting plate 20 is mounted at the bottom of the water tank 22, the supporting plate 20 can float up and down relative to the water tank 22. The thickness of the guide protrusion 201 is specifically the thickness of the guide protrusion 201 in the height direction of the smart sweeping robot 1, and the thickness of the guide groove 221 may alternatively be the thickness of the guide groove 221 in the height direction of the smart sweeping robot 1. The structural design of the guide structure only needs to meet the mounting requirements of the water tank 22 and the supporting plate 20, and ensure that the supporting plate 20 can move in the forward or backward direction of the smart sweeping robot 1. Optionally, the design of the guide structure further needs to ensure that after the supporting plate 20 is mounted on the water tank 22, the supporting plate 20 can float up and down relative to the water tank 22.

According to the smart cleaning device provided in the embodiments of the present disclosure, the entire cleaning assembly 200 can be removed from the machine body 100 of the smart sweeping robot 1 in the forward or backward direction of the smart sweeping robot 1, and the pallet 20 can also be separately removed from the body of the smart sweeping robot 1 in the forward or backward direction of the smart sweeping robot 1. This is convenient for operation.

Further referring to FIG. 6 and FIG. 7, according to the smart cleaning device provided in the embodiments of the present disclosure, further, after being mounted on the water tank 22, the supporting plate 20 is connected to the water tank 22 by using a connecting structure. The connecting structure includes a first connecting structure arranged on the water tank 22 and a second connecting structure arranged on the supporting plate 20, where the first connecting structure and the second connecting structure cooperate with each other. In some optional embodiments, the first connecting structure is a first hook 222 arranged on the water tank 22, and the second connecting structure is a second hook 202 arranged on the supporting plate 20. After the supporting plate 20 is mounted at the bottom of the water tank 22 by using the guide structure, the first hook 222 and the second hook 202 can be engaged with each other, so that the supporting plate 20 and the water tank 22 are firmly connected.

Further referring to FIG. 8 and FIG. 12, optionally, the connecting structure further includes a control structure 23. The control structure 23 is arranged on the supporting plate 20, and can control the connection and separation of the first hook 222 and the second hook 202. In some optional embodiments, the control structure 23 and the second hook 202 are an integrated structure. The control structure 23 includes: a mounting bracket 231, where the mounting bracket 231 is movably arranged on the supporting plate 20, and the second hook 202 is connected to one end of the mounting bracket 231 so that the second hook 202 can move to a stopper position or a bypass position under the driving of the mounting bracket 231; and an operating part 232, where the operating part 232 is arranged at the other end of the mounting bracket 231, and is arranged opposite to the second hook 202, so as to control the movement of the mounting bracket 231 by using the operating part 232. The specific operation process is as follows: when the operating part 232 is pressed toward the inside of the main body of the smart sweeping robot 1, the entire control structure 23 moves toward the inside of the main body of the smart sweeping robot 1. In this case, the second hook 202 is driven by the control structure 23 to move toward the inside of the main body of the smart sweeping robot 1 until reaching the bypass position, so that the first hook 222 and the second hook 202 are separated. After the first hook 222 and the second hook 202 are separated, the supporting plate 20 can be further removed from the water tank 22 along the guide structure. This is convenient for operation. After the cleaning cloth 21 is replaced, and the supporting plate 20 is mounted to the bottom of the water tank 22 again, the second hook 202 is located at the stopper position under the restriction of the guide protrusion 201, so that the first hook 222 and the second hook 202 are connected to each other, and further, the water tank 22 and the supporting plate 20 are firmly connected.

In some optional embodiments, the guide protrusion 201 is arranged on the supporting plate 20, and the guide protrusion 201 is an elastic structure. When the second hook 202 moves to the bypass position, the guide protrusion 201 can be elastically deformed under the pressure of the second hook 202, so that the first hook 222 and the second hook 202 are separated. When the second hook 202 moves to the stopper position, the guide protrusion 201 can be restored to the original state, so that the first hook 222 and the second hook 202 are connected to each other.

It can be understood that the control structure 23 may be but is not limited to the foregoing structural form. The control structure 23 can alternatively be arranged on the water tank 22. In addition, optionally, the control structure 23 and the first hook 222 can be an integrated structure, which can control the connection and separation of the first hook 222 and the second hook 202.

References are made to FIG. 1, FIG. 2, and FIG. 12. According to the smart cleaning device provided in the embodiments of the present disclosure, the supporting plate 20 and the cleaning cloth 21 are detachably connected using a sliding assembly. The sliding assembly includes a mounting groove 203 and a guide bar 211 that cooperate with each other. In some optional embodiments, the mounting groove 203 is arranged on the supporting plate 20, the guide bar 211 is arranged on the cleaning cloth 21, the guide bar 211 can penetrate into the mounting groove 203 to connect the cleaning cloth 21 and the supporting plate 20, and the guide bar 211 can stretch out of the mounting groove 203 to separate the cleaning cloth 21 from the supporting plate 20, so that when the cleaning cloth 21 needs to be removed, the cleaning cloth 21 can be directly removed from the supporting plate 20 for replacement or cleaning. This is convenient for operation. In addition, this can avoid a situation that when the cleaning cloth 21 is to be replaced for the existing smart sweeping robot 1, the smart sweeping robot 1 needs to be turned over and then the cleaning cloth 21 is removed together with the water tank 22 or the supporting plate 20, easily causing collision and damage to the smart sweeping robot 1, further damaging a sensor on the smart sweeping robot 1, or even causing irreparable damage to a circuit and a component inside the smart sweeping robot 1, which further results in greater economic loss. The supporting plate 20 and the water tank 22 are detachably connected. When the supporting plate 20 is mounted to or removed from the machine body 100, the supporting plate 20 moves in a forward or backward direction of the machine body 100, so that the cleaning cloth 21 together with the supporting plate 20 is removed from the water tank 22 of the smart sweeping robot 1. When the supporting plate 20 of the cleaning assembly 200 is assembled to or removed from the water tank 22, the supporting plate 20 moves in a forward or backward direction of the water tank 22, and generally the forward and backward directions of the water tank 22 are horizontal directions, which makes the mounting and removal of the supporting plate 20 with the cleaning cloth 21 more convenient, and further avoid a situation that the cleaning assembly 200 can be removed only when the smart sweeping robot 1 is turned over to the bottom side up. This further facilitates the replacement and maintenance of the cleaning assembly 200. It can be understood that the smart cleaning device may be but is not limited to the smart sweeping robot 1. In some other optional embodiments, the smart cleaning device may alternatively be a solar panel cleaning apparatus, a building exterior wall cleaning apparatus, etc.

It can be understood that the cleaning assembly 200 may be but is not limited to the foregoing structural form. In some other optional embodiments, the mounting groove 203 may alternatively be arranged on the cleaning cloth 21, and the guide bar 211 may alternatively be arranged on the supporting plate 20, provided that the mounting and removal of the supporting plate 20 and the cleaning cloth 21 can be conveniently implemented.

For example, in the embodiments shown in FIG. 1 and FIG. 12, the mounting groove 203 is arranged at an end portion of one side of the supporting plate 20 away from the machine body 100, and the guide bar 211 is arranged at a position on the cleaning cloth 21 corresponding to the mounting groove 203, that is, an end portion of the cleaning cloth 21. However, it can be understood that in some other optional embodiments, the mounting groove 203 may alternatively be arranged at a middle position of one side of the supporting plate 20 away from the machine body 100. Correspondingly, a position of the guide bar 211 on the cleaning cloth 21 corresponds to the mounting groove 203, that is, the guide bar 211 is arranged at a middle position of the cleaning cloth 21.

According to the smart cleaning device provided in the embodiments of the present disclosure, one end of the mounting groove 203 on the supporting plate 20 is a mounting end, and the other end of the mounting groove 203 is a stopper end. The guide bar 211 can penetrate into or stretch out of the mounting groove 203 by using the mounting end, and the stopper end restricts the guide bar 211 to stretch out of the mounting groove 203 from the stopper end.

In some optional embodiments, the guide bar 211 may be a plastic rod or a steel rod with specific rigidity, or may be a flexible strip. A cross-sectional shape of the guide bar 211 may be circular or another non-circular shape. A cross-sectional shape of the mounting groove 203 on the supporting plate 20 is a C-shape or a C-like shape, provided that the guide bar 211 can be accommodated and restricted. An opening of the mounting groove 203 for the cleaning cloth 21 to stretch faces downward, that is, the C-shaped opening faces downward. One end of the mounting groove 203 is a stretching-in end, and the stretching-in end does not have a stopper structure and is available for the guide bar 211 to stretch in. The other end of the mounting groove 203 is a stopper end, and the stopper end has a stopper structure to prevent the guide bar 211 from coming out of this end. In other words, one end of the mounting groove 203 is closed, and the other end of the mounting groove 203 is open. A tail of the cleaning cloth 21 is fixed on the supporting plate 20 through cooperation between the guide bar 211 and the mounting groove 203, thereby improving stability of the fixing and preventing the cleaning cloth 21 from falling off. The guide bar 211 and the mounting groove 203 are located on the supporting plate 20, facing the forward direction of the smart sweeping robot 1. The manner of first mounting the guide bar 211 and then sticking the cleaning cloth 21 on a Velcro ensures that the cleaning cloth 21 is mounted correctly.

Further referring to FIG. 1 and FIG. 2, the cleaning cloth 21 may be a cleaning cloth 21 made of the same material as a whole, or a composite cleaning cloth 21 made of different materials at different positions. In some optional embodiments, the cleaning cloth 21 is a composite cleaning cloth 21, and a main body of the cleaning cloth 21 is basically semicircular. An inner layer of the cleaning cloth 21 is a water seepage area, which is made of a material with a high water seepage rate. A middle layer of the cleaning cloth 21 is a dirt-removing area, which is made of a hard material and is used to scrape off hard matters on the floor. An outer layer of the cleaning cloth 21 is a water absorption area, which is made of a material with a good water absorption effect, and is used to absorb water on the floor and remove water stains and water marks. This can improve cleaning efficiency. The guide bar 211 is arranged on a straight line segment of a semicircle.

Further referring to FIG. 5 and FIG. 6, according to the smart cleaning device provided in the embodiments of the present disclosure, the supporting plate 20 is provided with a water passage hole 206 for connecting water in the water tank 22 to the cleaning cloth 21. In some optional embodiments, the water tank 22 may be an electronically controlled water tank 22 provided with a peristaltic pump, and a waterway board is arranged inside the smart sweeping robot 1. Optionally, the waterway board is a reversed return waterway board 25. The reversed return waterway board 25 is arranged between the machine body 100 and the supporting plate 20, and is detachably connected to the machine body 100. In addition, the reversed return waterway board 25 is provided with a water inlet port and a water outlet port 251, the water inlet port is connected to a water outlet pipeline of the peristaltic pump inside the water tank 22, and a position of the water outlet port 251 is arranged corresponding to the water passage hole 206 on the supporting plate 20, so that the water in the water tank 22 flows onto the cleaning cloth 21 through the water outlet port 251 of the reversed return waterway board 25 and the water passage hole 206 on the supporting plate 20.

Further referring to FIG. 1 and FIG. 2, according to the smart cleaning device provided in the embodiments of the present disclosure, the water tank 22 is arranged corresponding to the shape of the joint position of the machine body 100. After the water tank 22 is mounted on the machine body 100, an outer side wall of the water tank 22 is connected to the side wall of the machine body 100, a bottom wall of the water tank 22 is connected to a bottom wall of the machine body 100, and the water tank 22 at least partially surrounds an outer side of a fan inside the machine body 100. As shown in FIG. 2, the fan is arranged inside a fan mounting position 16. In some optional embodiments, the water tank 22 can be connected to or separated from the machine body 100 by using a button 24, and the supporting plate 20 is provided with a notch 204 for bypassing the button 24. Specifically, the notch 204 is a notch 204 that is arranged on the top of the supporting plate 20 and that matches an outline of the button 24. When the cleaning assembly 200 needs to be removed from the machine body 100, the cleaning assembly 200 can be detached from the machine body 100 by pressing and holding the button 24.

Further referring to FIG. 6, according to the smart cleaning device provided in the embodiments of the present disclosure, in some optional embodiments, an elastic part 205 is arranged on a side surface of the supporting plate 20 facing the water tank 22, and after the supporting plate 20 is mounted on the water tank 22, the supporting plate 20 is in elastic contact with the water tank 22, so that the water tank 22 can float up and down relatively smoothly. In addition, the elastic part 205 on the supporting plate 20 abuts against the bottom surface of the water tank 22, so that during operation of the supporting plate 20, a pressing force is generated between the supporting plate 20 and the floor, further attaching the cleaning cloth 21 to the floor more closely, and achieving a better cleaning effect. Optionally, the elastic part 205 includes a plurality of elastic buttons arranged at intervals on a side surface of the supporting plate facing the water tank 22, and a spring is arranged inside each of the elastic buttons.

It can be understood that the elastic part 205 may be but is not limited to the foregoing structure. The elastic part 205 may alternatively be arranged on a side surface of the water tank 22 facing the supporting plate 20. The elastic part 205 includes a plurality of elastic buttons arranged at intervals on a side surface of the water tank 22 facing the supporting plate 20. Certainly, the elastic part 205 can be arranged on both the side surface of the water tank 22 facing the supporting plate 20 and the side surface of the supporting plate 20 facing the water tank 22. After the supporting plate 20 is mounted on the water tank 22, the supporting plate 20 is in elastic contact with the water tank 22. When the elastic part 205 is arranged on both the side surface of the water tank 22 facing the supporting plate 20 and the side surface of the supporting plate 20 facing the water tank 22, more preferably, the elastic part 205 arranged on the side surface of the water tank 22 facing the supporting plate 20 and the elastic part 205 arranged on the side surface of the supporting plate 20 facing the water tank 22 are staggered, so as to further achieve a better elastic contact effect between the water tank 22 and the supporting plate 20.

Further referring to FIG. 1 and FIG. 2, according to the smart cleaning device provided in the embodiments of the present disclosure, in some optional embodiments, the machine body 100 includes a perception system (700), a control system (800), a driving system 10, an energy system, a man-machine interaction system, a dry cleaning portion 13, etc. The following describes the main parts of the smart cleaning device.

In some optional embodiments, the machine body 100 further includes an upper cover, a forward portion, a backward portion, a chassis, etc. The machine body 100 has an approximate circular shape or may have other shapes, including but not limited to the approximate D-shape, that is, the front is straight and the back is circular.

The perception system includes sensing apparatuses such as a position determining apparatus located in an upper part of the machine body 100, a buffer located in the forward portion of the machine body 100, a cliff sensor, an ultrasonic sensor, an infrared sensor, a magnetometer, an accelerometer, a gyroscope, and an odometer. These sensing apparatuses provide various position information and motion state information of the machine for the control system. The position determining apparatus includes but is not limited to an infrared emitting and receiving apparatus, a camera, and a laser distance sensor (LDS).

The driving system 10 is configured to drive the machine body 100 and the parts thereon to move, so as to implement automatic walking and sweeping. The driving system 10 includes a driving wheel module 101. The driving system 10 can send a driving command to control the smart sweeping robot 1 to move across the floor, based on distance and angle information such as x, y, and θ components. The driving wheel module 101 can control a left wheel and a right wheel simultaneously. To control the movement of the machine more accurately, the driving wheel module 101 preferably includes a left driving wheel module and a right driving wheel module. The left and right driving wheel modules are symmetrically arranged along a lateral axis that is defined by the machine body 100. Optionally, the left and right driving wheel modules are symmetrically arranged. To enable the smart sweeping robot 1 to move more stably on the floor or to have a higher movement ability, the smart sweeping robot 1 may include one or more driven wheels 102, and the driven wheels include but are not limited to universal wheels.

The driving wheel module 101 includes a traveling wheel, a driving motor, and a control circuit for controlling the driving motor. The driving wheel module 101 can alternatively be connected to a circuit for measuring a drive current, and to an odometer. The driving wheel module 101 can be detachably connected to the machine body 100 for easy assembly, disassembly, and maintenance. The driving wheel may have a biased-to-drop hanging system, which is secured in a movable manner, for example, is attached to the machine body 100 in a rotatable manner, and receives a spring bias that is offset downward and away from the machine body 100. The spring bias allows the driving wheel to maintain contact and traction with the floor by using a specific touchdown force, and the cleaning element (such as the rolling brush 131) of the smart sweeping robot 1 is also in contact with the floor with a specific pressure.

The forward portion 14 of the machine body 100 may carry a buffer. When the driving wheel module 101 drives the smart sweeping robot 1 to walk on the floor during cleaning, the buffer detects one or more events in the traveling route of the smart sweeping robot 1 by using a sensor system, such as an infrared sensor. Based on the events detected by the buffer, such as obstacles and walls, the smart sweeping robot 1 can control the driving wheel module 101 to enable the smart sweeping robot 1 to respond to the events, for example, keep away from the obstacles.

The control system is set on the main circuit board in the machine body 100. The control system includes non-transient memories such as a hard disk, a flash memory, and a random access memory, and computing processors for communication, such as a central processing unit and an application processor. The application processor draws, based on obstacle information fed back by a laser distance sensor and by using a positioning algorithm such as SLAM, an instant map of an environment in which the smart sweeping robot 1 is located. With reference to distance information and velocity information fed back by sensing apparatuses such as the buffer, the cliff sensor 11, the ultrasonic sensor, the infrared sensor, the magnetometer, the accelerometer, the gyroscope, and the odometer, the control system comprehensively determines a current working status of the sweeping machine, such as crossing a threshold, walking on a carpet, reaching a cliff, being stuck by the upper part or lower part, full dust box, or being picked up. In addition, the control system provides a specific next action strategy based on different situations, so that the smart sweeping robot 1 better meets the user's requirements, providing better user experience. Furthermore, the control system can plan a most efficient and reasonable sweeping route and sweeping manner based on information about the instant map that is drawn based on SLAM, thereby greatly improving the sweeping efficiency of the smart sweeping robot 1.

The energy system includes a rechargeable battery, for example, a NiMH battery or a lithium battery. The rechargeable battery can be connected to a charging control circuit, a battery pack charging temperature detection circuit, and a battery undervoltage monitoring circuit. The charging control circuit, the battery pack charging temperature detection circuit, and the battery undervoltage monitoring circuit are connected to a single-chip microcomputer control circuit. The robot is charged by connecting a charging electrode arranged on a side or a lower part of the machine body to the charging pile. If there is dust on the exposed charging electrode, the plastic part around the electrode is melted and deformed due to a charge accumulation effect, or even the electrode is deformed and cannot perform charging normally.

The man-machine interaction system 12 includes buttons on a panel of the robot, which are used by the user to select functions; may further include a display screen, an indicator, and/or a horn, which display the current status of the machine or function options for the user; and may further include a mobile phone client program. For a route-navigated cleaning device, the mobile phone client can show the user a map of the environment in which the device is located, as well as the location of the machine, providing the user with more abundant and user-friendly function options.

References are further made to FIG. 3. To describe behavior of the smart sweeping robot 1 more clearly, the following describes definitions of directions. The smart sweeping robot 1 can travel on the floor based on various combinations of movements relative to the following three mutually perpendicular axes defined by the machine body 100: the front-back axis X (that is, the axis along the direction of the forward portion 14 and the backward portion 15 of the machine body 100), the lateral axis Y (that is, the axis perpendicular to the axis X and located on the same horizontal plane as the axis X), and the central vertical axis Z (the axis perpendicular to the plane formed by the axis X and the axis Y). The forward driving direction along the front-back axis X is marked as "forward", and the backward driving direction along the front-back axis X is marked as "backward". The lateral axis Y essentially extends between the right and left wheels of the smart sweeping robot 1 along an axial center defined by the center point of the driving wheel module 101.

The smart sweeping robot 1 can rotate around the axis Y. When the forward portion of the smart sweeping robot 1 is tilted upward and the backward portion is tilted downward, "pitchup" is formed. When the forward portion of the smart sweeping robot 1 is tilted downward and the backward portion is tilted upward, "pitchdown" is formed. In addition, the smart sweeping robot 1 can rotate around the axis Z. In the forward direction of the smart sweeping robot 1, when the smart sweeping robot 1 tilts to the right of the axis X, "right turn" is formed; and when the smart sweeping robot 1 tilts to the left of the axis X, "left turn" is formed.

The dust box is mounted in a receiving cavity through clamping of a manipulator. When the manipulator is clamped, a clamping part is contracted. When the manipulator is released, the clamping part stretches out and is clamped in a recess for holding the clamping part in the receiving cavity.

The cleaning assembly 200 serves as a wet cleaning portion of the smart sweeping robot 1, and its main function is to wipe a to-be-cleaned surface (such as a floor) by using a cleaning cloth 21 that contains cleaning liquid. A main function of the dry cleaning portion 13 is to remove specific particulate pollutants from the to-be-cleaned surface by using a structure such as a sweeping brush. The main cleaning function of the dry cleaning portion 13 is derived from the second cleaning portion that includes a rolling brush 131, a dust box, a fan, an air outlet, and connecting parts between the four parts. The rolling brush 131 that has specific interference with the floor sweeps rubbish on the floor and rolls the rubbish to the front of a dust suction port between the rolling brush 131 and the dust box, and then the rubbish is sucked into the dust box by gas that is generated by the fan and that has suction force and passes through the dust box. A dust removal ability of the smart sweeping robot 1 can be represented by dust pick up efficiency (DPU). The DPU is affected by a structure and material of the rolling brush 131, by wind power utilization of an air duct made up of the dust suction port, the dust box, the fan, the air outlet, and the connecting parts between the four parts, and by a type and power of the fan. The increase in the dust removal ability is more significant for energy-limited smart sweeping robots 1 than for plug-in cleaners. The increase in the dust removal ability directly and effectively reduces the energy requirement, that is, a smart sweeping robot 1 that can clean 80 square meters of the floor previously after being charged for one time can be evolved to clean 100 or more square meters of the floor after being charged for one time. In addition, as a quantity of charging times decreases, a service life of a battery increases greatly, so that frequency of replacing the battery by the user decreases. More intuitively and importantly, a higher dust removal ability is the most visible and important user experience, because it allows the user to directly determine whether the floor is swept/wiped clean. The dry cleaning assembly 200 may further include a side brush 132 having a rotating shaft. The rotating shaft is located at an angle relative to the floor, so as to move debris into a sweeping region of the rolling brush 131 of the second cleaning portion.

Embodiments of the present disclosure further provide a sealing structure 300. The sealing structure 300 can achieve a good sealing effect on the infrared wall-following module, and has a good dust-proof effect, so that it is not easy for dust to enter the infrared wall-following module, and thus the infrared wall-following module is well protected.

To better understand the technical solutions provided in the present disclosure, the following describes in detail the sealing structure 300 according to the embodiments of the present disclosure with reference to FIG. 13 to FIG. 16.

Figure 13:
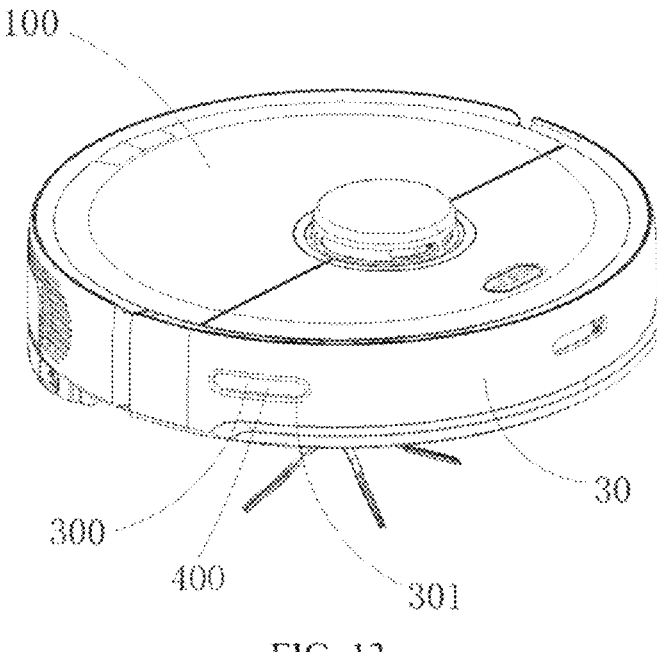
FIG. 13 is an axonometric view of a smart cleaning device according to some embodiments of the present disclosure.
Figure 14:
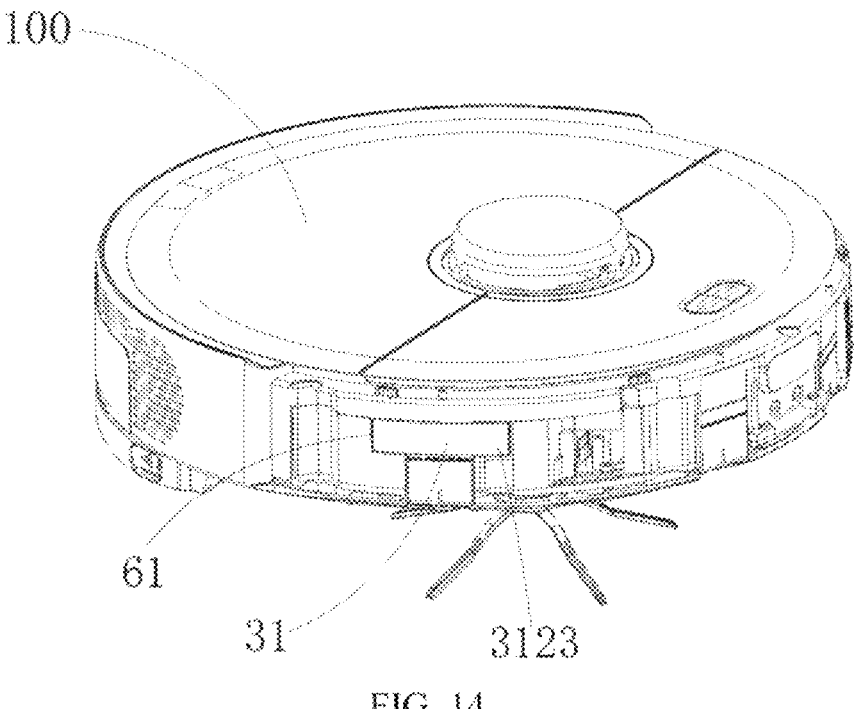
FIG. 14 is an axonometric view of a smart cleaning device after a protective shell is removed according to some embodiments of the present disclosure.
Figure 15:
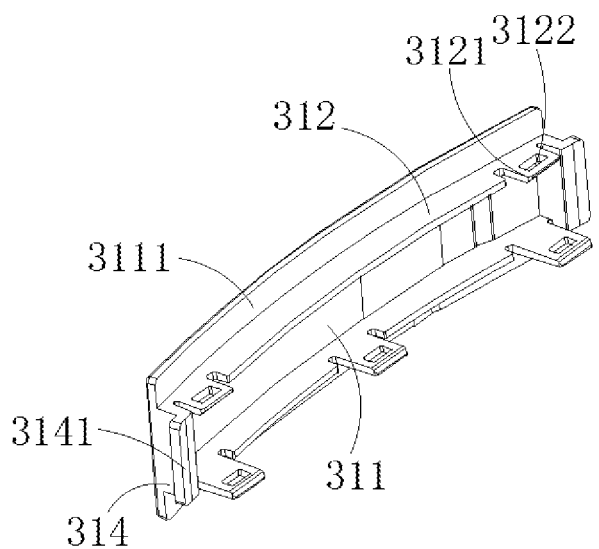
FIG. 15 is an axonometric view of a lens according to some embodiments of the present disclosure.
Figure 16:
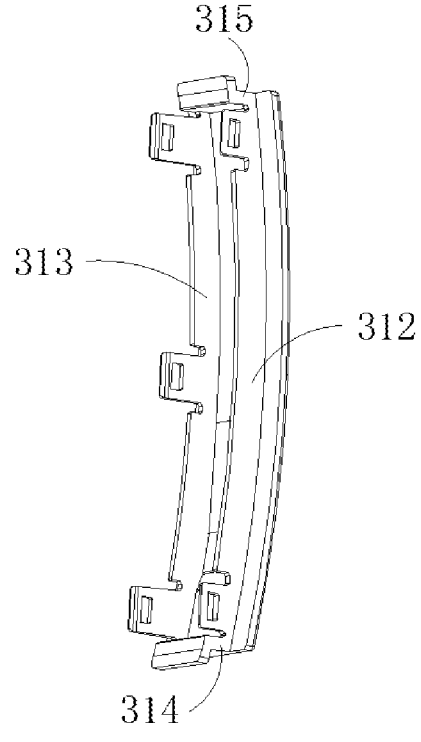
FIG. 16 is an axonometric view of a lens from another perspective according to some embodiments of the present disclosure.

References are made to FIG. 13 to FIG. 16. FIG. 13 is an axonometric view of a smart cleaning device according to some embodiments of the present disclosure. FIG. 14 is an axonometric view of a smart cleaning device after a protective shell 30 is removed according to some embodiments of the present disclosure. FIG. 15 is an axonometric view of a lens 31 according to some embodiments of the present disclosure. FIG. 16 is an axonometric view of a lens from another perspective according to some embodiments of the present disclosure.

Referring to FIG. 13 to FIG. 16, the sealing structure 300 provided in the embodiments of the present disclosure is configured to seal an infrared wall-following module 400 of the smart cleaning device. The sealing structure 300 includes a housing (61) and a lens 31. The housing is connected to a side of the infrared wall-following module facing a protective shell 30 of the smart cleaning device. The lens 31 is connected to the housing, and the lens 31 covers a side surface of the housing facing the protective shell 30. The lens 31 includes an arc-shaped panel 311 and a connecting plate that is arranged on an edge of the arc-shaped panel 311 and that extends toward the infrared wall-following module. Optionally, the lens 31 is a transparent lens, and may further be a glass sheet. The housing is a structure adapted to the lens 31, and a specific structure of the housing is omitted herein for simplicity.

According to the sealing structure 300 provided in the embodiments of the present disclosure, the housing is connected to the lens 31 by using an engaging structure; the engaging structure includes an engaging buckle 3123 and an engaging hole 3122 that cooperate with each other; the engaging buckle is arranged on one of the housing and the lens 31; and the engaging hole 3122 is arranged on the other of the housing and the lens 31".

According to the sealing structure 300 provided in the embodiments of the present disclosure, at least a part of the connecting plate is provided with a connecting arm 3121; the engaging hole 3122 is arranged at an end of the connecting arm 3121 away from the arc-shaped panel 311; and the engaging buckle is arranged at a position on the housing corresponding to the engaging hole 3122, so as to implement the connection between the housing and the lens 31.

Further referring to FIG. 15 and FIG. 16, according to the sealing structure 300 provided in the embodiments of the present disclosure, in some optional embodiments, the arc-shaped panel 311 can be obtained by bending a rectangular panel, and the arc-shaped panel 311 has four outer edges. Correspondingly, there are four connecting plates, the four connecting plates respectively extend from the four outer edges of the arc-shaped panel 311, and the two connecting plates extending from the two long sides of the arc-shaped panel 311 are arranged oppositely. In an embodiment of the present disclosure, the two connecting plates extending from the two long sides of the arc-shaped panel 311 are a first connecting plate 312 and a second connecting plate 313, respectively. The first connecting plate 312 is provided with two connecting arms 3121, the two connecting arms 3121 are arranged at intervals in a length direction of the first connecting plate 312, the two connecting arms 3121 are respectively arranged at both ends of the first connecting plate 312, and an end of each connecting arm 3121 away from the arc-shaped panel 311 is provided with an engaging hole 3122. The second connecting plate 313 is provided with three connecting arms 3121, the three connecting arms 3121 are arranged at intervals in the length direction of the first connecting plate 312, and the two connecting arms 3121 are respectively arranged at both ends of the second connecting plate 313. The other connecting arm 3121 is arranged in the middle of the second connecting plate 313, and an end of each connecting arm 3121 away from the arc-shaped panel 311 is provided with an engaging hole 3122. Optionally, the engaging hole 3122 is a bar-shaped through hole structure penetrating the connecting arm 3121 in a thickness direction of the connecting arm 3121.

According to the sealing structure 300 provided in the embodiments of the present disclosure, in some optional embodiments, an engaging buckle (not shown in the figure) is arranged at a position on the housing corresponding to the engaging hole 3122. When the lens 31 is mounted on the housing, the engaging buckle can be placed in the engaging hole 3122 to implement the connection between the housing and the lens 31.

According to the sealing structure 300 provided in the embodiments of the present disclosure, in some optional embodiments, the sealing structure 300 further includes at least one first extension plate 3111 extending from the arc-shaped panel 311, where the extension plate is smoothly connected to the arc-shaped panel 311. In addition, the sealing structure 300 further includes at least one second extension plate 3141 extending from the connecting plate in a direction away from the arc-shaped panel 311, where the second extension plate 3141 and the connecting plate are arranged to intersect each other.

Optionally, the first extension plate 3111 extends from the side of the arc-shaped panel 311 on which the first connecting plate 312 and the second connecting plate 313 are arranged, and an extended width is one-third to three-quarters of the width of the arc-shaped panel 311. The arrangement of the first extension plate 3111 can further strengthen the protective effect of the sealing structure 300 on the infrared wall-following module. Under unfavorable conditions, even if dust is in direct contact with the lens 31, the dust does not directly enter the infrared wall-following module. Instead, part of the dust is attached to the first extension plate 3111. In this way, the dust is prevented from entering the infrared wall-following module.

Optionally, the two connecting plates extending from the two short sides of the arc-shaped panel 311 are a third connecting plate 314 and a fourth connecting plate 315, respectively. There are two second extension plates 3141, and the two second extension plates respectively extend from the third connecting plate 314 and the fourth connecting plate 315, and are arranged to intersect the third connecting plate 314 and the fourth connecting plate 315, respectively. In an embodiment of the present disclosure, an included angle between the second extension plate 3141 and the third connecting plate 314, and an included angle between the second extension plate 3141 and the fourth connecting plate 315 are both right angles or approximately right angles. Similarly, the arrangement of the second extension plate 3141 can further strengthen the protective effect of the sealing structure 300 on the infrared wall-following module. Under unfavorable conditions, even if dust is in direct contact with the lens 31, the dust does not directly enter the infrared wall-following module. Instead, part of the dust is attached to the second extension plate 3141. In this way, the dust is prevented from entering the infrared wall-following module.

It can be understood that the sealing structure 300 may be but is not limited to the foregoing specific structure. For example, the sealing structure 300 may include only at least one of the first connecting plate 312, the second connecting plate 313, the third connecting plate 314, and the fourth connecting plate 315. Four first extension plates 3111 may be arranged. The four first extension plates 3111 respectively extend from the four outer edges of the arc-shaped panel 311. There may be two, three, or four second extension plates 3141. This is not specifically limited in the present application.

According to the sealing structure 300 provided in the embodiments of the present disclosure, in some optional embodiments, the housing includes an upper housing and a lower housing that cooperate with each other, and the upper housing and the lower housing are detachably connected (not shown in the figure). The protective shell 30 of the smart cleaning device is arranged on an outer side of the sealing structure 300, and is cooperatively connected with the machine body 100 to protect the machine body 100. In an embodiment of the present disclosure, the protective shell 30 is a structure similar to a semi-circular arc plate, and is arranged corresponding to the forward portion 14 of the machine body. A through hole 301 is arranged at a position on the protective shell 30 corresponding to the arc-shaped panel 311. After the smart cleaning device is used for a period of time, dust is attached to the lens 31, and the dust can be removed directly through the through hole 301. This is convenient for operation and helps completely remove the dust.

According to the sealing structure 300 provided in the embodiments of the present disclosure, in some optional embodiments, a side surface of the lens 31 facing the protective shell 30 is closely attached to an inner wall of the protective shell 30. When the lens 31 and the protective shell 30 are arranged in close contact, there is no gap between the lens 31 and the protective shell 30, and to a certain extent, dust can be attached only to the part of the lens 31 exposed through the through hole 301 on the protective shell 30. This further prevents dust from entering the infrared wall-following module, and further helps remove the dust.

The embodiments of the present disclosure provide a sealing structure and a smart cleaning device. The sealing structure is configured to seal an infrared wall-following module of the smart cleaning device. The sealing structure includes a housing and a lens. The housing is connected to a side of the infrared wall-following module facing a protective shell of the smart cleaning device. The lens is connected to the housing, and the lens covers a side surface of the housing facing the protective shell. The lens includes an arc-shaped panel and a connecting plate that is arranged on an edge of the arc-shaped panel and that extends toward the infrared wall-following module. The housing cooperates with the lens to jointly seal the infrared wall-following module, and a sealing effect is good, so that it is not easy for dust to enter the infrared wall-following module, and thus the infrared wall-following module is well protected.

Although the present disclosure has been described with reference to optional embodiments, without departing from the scope of the present disclosure, various improvements can be made to the present disclosure and equivalents can be used to replace the parts incorporating the features. In particular, various technical features mentioned in various embodiments can be combined in any manner provided that there is no structural conflict. The present disclosure is not limited to the specific embodiments disclosed in the present specification, but includes all technical solutions falling within the scope of the claims.

What is claimed is:

1. A smart cleaning device, comprising:

a machine body, wherein the machine body is internally provided with an infrared wall-following module;

a sealing structure, wherein the sealing structure is configured to seal an infrared wall-following module of a smart cleaning device and comprising a housing and a lens, wherein the housing is connected to a side of the infrared wall following module facing a protective shell of the smart cleaning device, and the lens is connected to the housing and covers a side of the housing facing the protective shell; the lens comprises an arc-shaped panel and a connecting plate that is arranged on an edge of the arc-shaped panel and that extends toward the infrared wall-following module; and the arc-shaped panel and the connecting plate are arranged to intersect each other, wherein the sealing structure is arranged on an outer side of the infrared wall-following module and is configured to seal the infrared wall-following module; and wherein the protective shell is arranged on an outer side of the sealing structure, and is cooperatively connected with the machine body to protect the machine body, wherein a through hole is arranged at a position on the protective shell corresponding to the arc-shaped panel.

2. The smart cleaning device according to claim 1, wherein a side surface of the lens facing the protective shell is closely attached to an inner wall of the protective shell.

3. The smart cleaning device according to claim 1, wherein the housing is connected to the lens by using an engaging structure; the engaging structure comprises an engaging buckle and an engaging hole that cooperate with each other; the engaging buckle is arranged on one of the housing and the lens; and the engaging hole is arranged on the other of the housing and the lens.

4. The smart cleaning device according to claim 3, wherein at least a part of the connecting plate is provided with a connecting arm; the engaging hole is arranged at an end of the connecting arm away from the arc-shaped panel; and the engaging buckle is arranged at a position on the housing corresponding to the engaging hole, so as to implement the connection between the housing and the lens.

5. The smart cleaning device according to claim 3, wherein the engaging hole is a bar-shaped through hole structure penetrating the connecting plate in a thickness direction of the connecting plate.

6. The smart cleaning device according to claim 1, further comprising at least one first extension plate extending from the arc-shaped panel, wherein the first extension plate is connected to the arc-shaped panel in a gradual transition manner.

7. The smart cleaning device according to claim 1, further comprising at least one second extension plate extending from the connecting plate in a direction away from the arc-shaped panel, wherein the second extension plate and the connecting plate are arranged to intersect each other.

8. The smart cleaning device according to claim 1, wherein the housing comprises an upper housing and a lower housing that cooperate with each other, and the upper housing and the lower housing are detachably connected.

* * * * *